(12) United States Patent
Krausz et al.

(10) Patent No.: US 7,571,940 B2
(45) Date of Patent: Aug. 11, 2009

(54) PIPE COUPLING WITH BUILT-IN GRIP

(75) Inventors: Eliezer Krausz, Tel-Aviv (IL); Avi Chiproot, Kfar-Saba (IL)

(73) Assignee: Krausz Metal Industries Ltd., Tel Aviv (IL)

( * ) Notice: Subject to any disclaimer, the term of this patent is extended or adjusted under 35 U.S.C. 154(b) by 56 days.

(21) Appl. No.: 11/987,802

(22) Filed: Dec. 4, 2007

(65) Prior Publication Data

US 2009/0140520 A1    Jun. 4, 2009

(51) Int. Cl.
*F16L 35/00* (2006.01)
(52) U.S. Cl. .................. 285/421; 285/343; 285/373; 285/323
(58) Field of Classification Search ................ 285/421, 285/420, 343, 373, 419, 323
See application file for complete search history.

(56) References Cited

U.S. PATENT DOCUMENTS

| | | | | |
|---|---|---|---|---|
| 1,830,782 A * | 11/1931 | Burnish et al. | ............... | 285/420 |
| 3,432,189 A * | 3/1969 | Buller | ............... | 285/232 |
| 4,070,046 A * | 1/1978 | Felker et al. | ............... | 285/421 |
| 4,538,841 A * | 9/1985 | Royston | ............... | 285/343 |
| 4,606,565 A * | 8/1986 | Royston | ............... | 285/343 |
| 4,807,912 A * | 2/1989 | Maier | ............... | 285/373 |
| 5,941,576 A * | 8/1999 | Krausz | ............... | 285/345 |
| 6,106,029 A * | 8/2000 | DeMore et al. | ............... | 285/322 |
| 6,129,391 A * | 10/2000 | Rakieski | ............... | 285/421 |
| 6,293,556 B1 * | 9/2001 | Krausz | ............... | 285/369 |
| 6,843,514 B2 * | 1/2005 | Rex et al. | ............... | 285/341 |
| 6,851,728 B2 * | 2/2005 | Minami | ............... | 285/342 |
| 7,243,955 B2 * | 7/2007 | Krausz et al. | ............... | 285/236 |
| 2006/0138776 A1 | 6/2006 | Ameddure et al. | | |
| 2006/0192384 A1 | 8/2006 | Lundstrom | | |
| 2006/0214422 A1 | 9/2006 | Cuvo et al. | | |
| 2006/0265852 A1 | 11/2006 | Snyder, Sr. et al. | | |
| 2006/0267343 A1 | 11/2006 | Wright | | |
| 2007/0085341 A1 | 4/2007 | Walmsley | | |

* cited by examiner

*Primary Examiner*—David E Bochna
(74) *Attorney, Agent, or Firm*—Pearl Cohen Zedek Latzer, LLP; Mark S. Cohen

(57) ABSTRACT

The invention provides an improved coupling having an innovative pipe grip preventing inadvertent separation of the two items being coupled. The improved releasable band-clamp coupling comprises a central housing of cross-section resembling a wide, low-wall channel, the housing being curved to be larger than the outer diameter of a pipe, two curved outer clamp members each configured to contact a wall of the housing and to support a ring seal member and to support a sloped mechanical grip ring, there being further provided proximate to the ends of the curved outer clamp members a pair of substantially parallel pair of clamping extensions, and a sloped internally-toothed grip ring comprising a plurality of spaced-apart wedge-shaped gripper units, each unit being connected to both adjacent gripper units by a flexible element to complete said grip ring; and screw clamping elements in contact with said clamping extensions to reduce the distance between said substantially parallel clamping extensions.

7 Claims, 8 Drawing Sheets

US 7,571,940 B2

PIPE COUPLING WITH BUILT-IN GRIP

FIELD OF THE INVENTION

The present invention relates to a coupling for cylinders or pipes. More particularly, the invention provides an improved coupling having an innovative pipe grip preventing inadvertent separation of the two items being coupled.

BACKGROUND OF THE INVENTION

As has been noted in our previous patents, pipe couplings have been in service since the dawn of the industrial age, and thousands of different designs are known. There is no best coupling for all purposes, so users must choose the features required for a particular application, and then choose the lowest cost coupling meeting those specifications. The variables are many: diameter, diameter variability, degree of sealing required, fluid being transferred, hydraulic pressure, exposure to the outside or not, removable or permanent, weight limitations, space limitations, ease of installation and further factors all of which influence the selection of a coupling.

The present inventors have disclosed and received patents on many design variations, relating to removable band-type couplings for pipes where sealing is required. Many of our designs also provide for resistance to mechanical forces tending to separate one or two unflanged pipes. The present disclosure relates to an improvement in the gripping of the pipes to better resist these axial separation forces.

The present invention is preferably for large diameter pipes, but not limited thereto. Furthermore there are many special designs, for example swage lock systems, which are cost-effective for small copper tubes, the coupling being of moderate weight. A review of the latest US patent applications provides the basis for assessing the state of the art.

In US Patent application 2006/0138776 Ameddure et al. disclose a band-type pipe coupling which is intended to improve sealing in the area of the clamp gap. There is no feature addressing the problem of axial separation except the normal frictional resistance of the seal.

A more sophisticated and complex arrangement is proposed by Lundstrom in US patent application 2006/0192384. A large number of peripheral pressure screws supported in bosses are to be tightened to grip the pipe and to prevent axial movement thereof. For large diameter pipes the proposed design is not competitive in cost relative to a band clamp.

Cuvo et al. disclose a pipe coupling in US patent application 2006/0214422 which is provided with a metal pipe grip washer. The band has a complex shape and is poorly adapted to cope with pipe diameter variations.

Seen in US patent application 2006/0265852 to Snyder, SR. et al. is quite similar to the Cuvo application. It is probably intended only for short small diameter applications as seen by the two grooves which need to be cut in the pipe.

A similar problem is seen in the coupling proposed by Wright in US 2006/0267343. The design relies on a series of axially spaced peripheral teeth. As the pipe may be 250 mm diameter and 6 meters long it is difficult to cut such teeth even in the factory and even more difficult in the field.

The coupling disclosed by Walmsley et al. in US 2007/0085341 has a set of bolts or screw studs on center compression plates which may be removed after axially compressing the coupling. The remaining resistance force to axial separation would be marginal.

OBJECTS OF THE INVENTION

It is therefore one of the objects of the present invention to obviate the disadvantages of prior art couplings and to provide a design with an improved pipe clamp.

It is a further object of the present invention to maintain the advantages of a band clamp such as light weight, adaptability to minor diameter variation, releasable connection and maintaining the possibility of field installation.

It is yet a further object of the invention to provide a pipe coupling with built in modular grip means.

SUMMARY OF THE INVENTION

The present invention achieves the above objects by providing an improved releasable band-clamp coupling for mechanical and hydraulic interconnection of at least one end of a first cylinder and a second cylinder or connecting means, said coupling comprising:
a) a central housing of cross-section resembling a wide, low-wall channel, the walls thereof facing away from the center of said cylinders and the housing being curved to be larger than the said cylinder outer diameter;
b) al least one curved outer clamp member configured to contact a wall of said central housing and to support a ring seal member and to support a sloped mechanical grip ring, said outer clamp members low-wall inner channel fitting into said outer channel to prevent separation therebetween, there being further provided proximate to the end of said curved outer clamp member at least one clamping extension;
c) a sloped internally-toothed grip ring comprising a plurality of spaced-apart wedge-shaped gripper units, each unit being connected to both adjacent gripper units by a flexible element to complete said grip ring;
d) at least one circumferential elastomeric seal member; and
e) screw clamping element in contact with said clamping extension to reduce the distance between said substantially parallel clamping extensions, forcing both said sloped internally-toothed grip ring and said elastomeric seal members into circumferential contact with said cylinder.

PREFERRED EMBODIMENTS OF THE INVENTION

In a preferred embodiment of the present invention there is provided a band-clamp coupling, wherein said wedge-shaped gripper units have a face to contact the cylinder being gripped, a multitude of elements being supported by said face and projecting therefrom in a manner that in operation said elements are forced into contact with the cylinders being coupled.

In a further preferred embodiment of the present invention there is provided a band-clamp coupling wherein said wedge-shaped gripper units have a face to contact the cylinder being gripped, a multitude of elements being supported by said face and projecting therefrom in a manner that in operation said elements are forced into contact with the cylinders being coupled.

In another preferred embodiment of the present invention there is provided a band-clamp coupling wherein said wedge-shaped gripper units comprise two separate parts, an inner face arranged to contact said cylinder surface, and an outer wedge-like portion configured to flexibly support and retain said inner face.

In a further preferred embodiment of the present invention there is provided a band-clamp coupling wherein an extremity of two said grip ring flexible elements are retained, one on each side of said gripper units, between said two separate parts.

In a further preferred embodiment of the present invention there is provided a band-clamp coupling wherein said wedge-shaped sloped internally-toothed grip ring is open and comprises a plurality of spaced-apart wedge-shaped gripper units is in the form of a strip which can be cut on site to any required length.

In yet a further preferred embodiment of the present invention there is provided a band-clamp coupling wherein said spaced-apart wedge-shaped gripper units are connected to both adjacent gripper units by a flexible element to complete said grip ring.

In a most preferred embodiment of the present invention there is provided a band-clamp coupling wherein said cylinders are pipes.

It will thus be realized that the novel coupling of the present invention serves to provide greatly improved resistance to axial separation forces. The inserts used enter the outer skin of the pipes, and so improve resistance to unwanted separation, whether the forces originate in loads internal or external to the pipe, during installation or because of temperature changes or earth movements.

All the advantages of a band clamp have been retained. These include tolerance for minor pipe diameter variations, small outer dimensions, avoidance of welding light weight and low cost in relation to a conventional pipe coupling. Furthermore the large diameter and long pipe to be coupled requires no steps or ridges which are difficult to form in a well-equipped workshop and are practically impossible to produce in the field.

The features of the present invention which have been detailed in earlier patents will be described briefly, as opposed to the new pipe gripping arrangement to be dealt with in detail.

For simplicity the cylinders to be coupled will in the following description be referred to as pipes, as this is the major application. It is however obvious that pipe fittings of any type can also be connected to each other or to a pipe by means of the coupling, provided a cylindrical male port of a suitable diameter is available on the item to be connected. Further, the description referred to the connection of two pipe ends, however the coupling could be used to connect one pipe end with other items or having a flanged end and the like.

BRIEF DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

In the drawings.

DETAILED DESCRIPTION OF PREFERRED EXEMPLARY EMBODIMENTS

Figure 1:
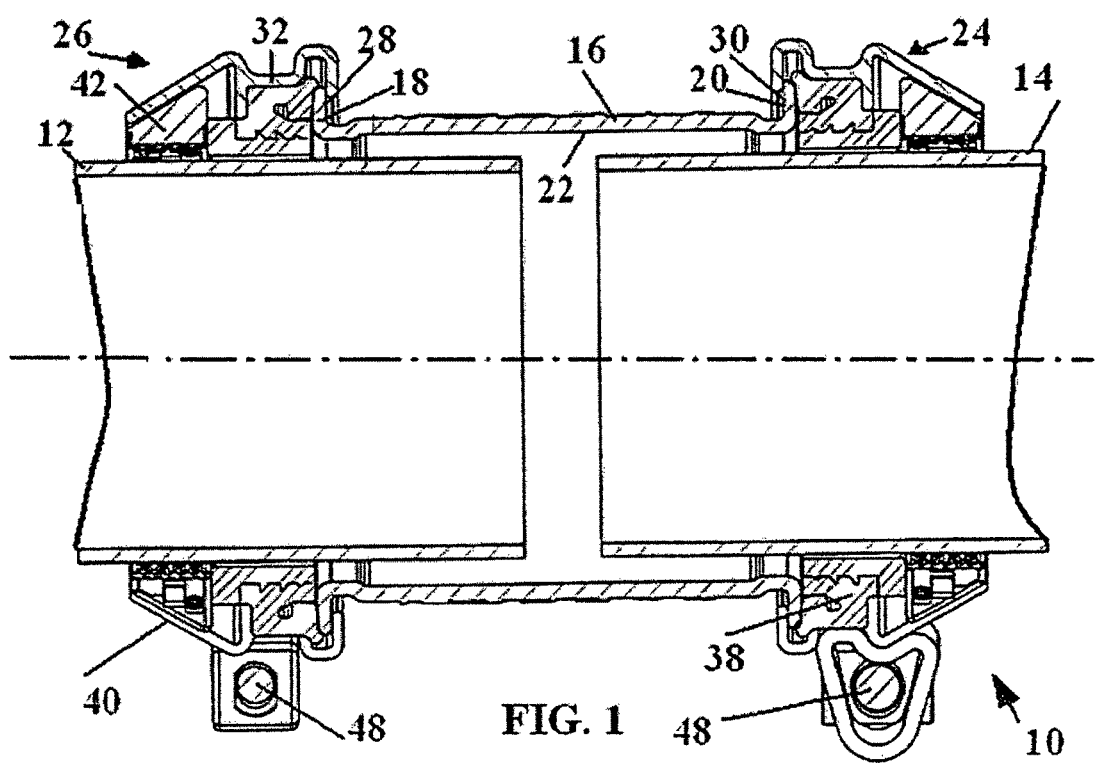
FIG. 1 is a cross-sectional view taken parallel to the axis of a preferred embodiment of the coupling according to the invention.
Figure 2:
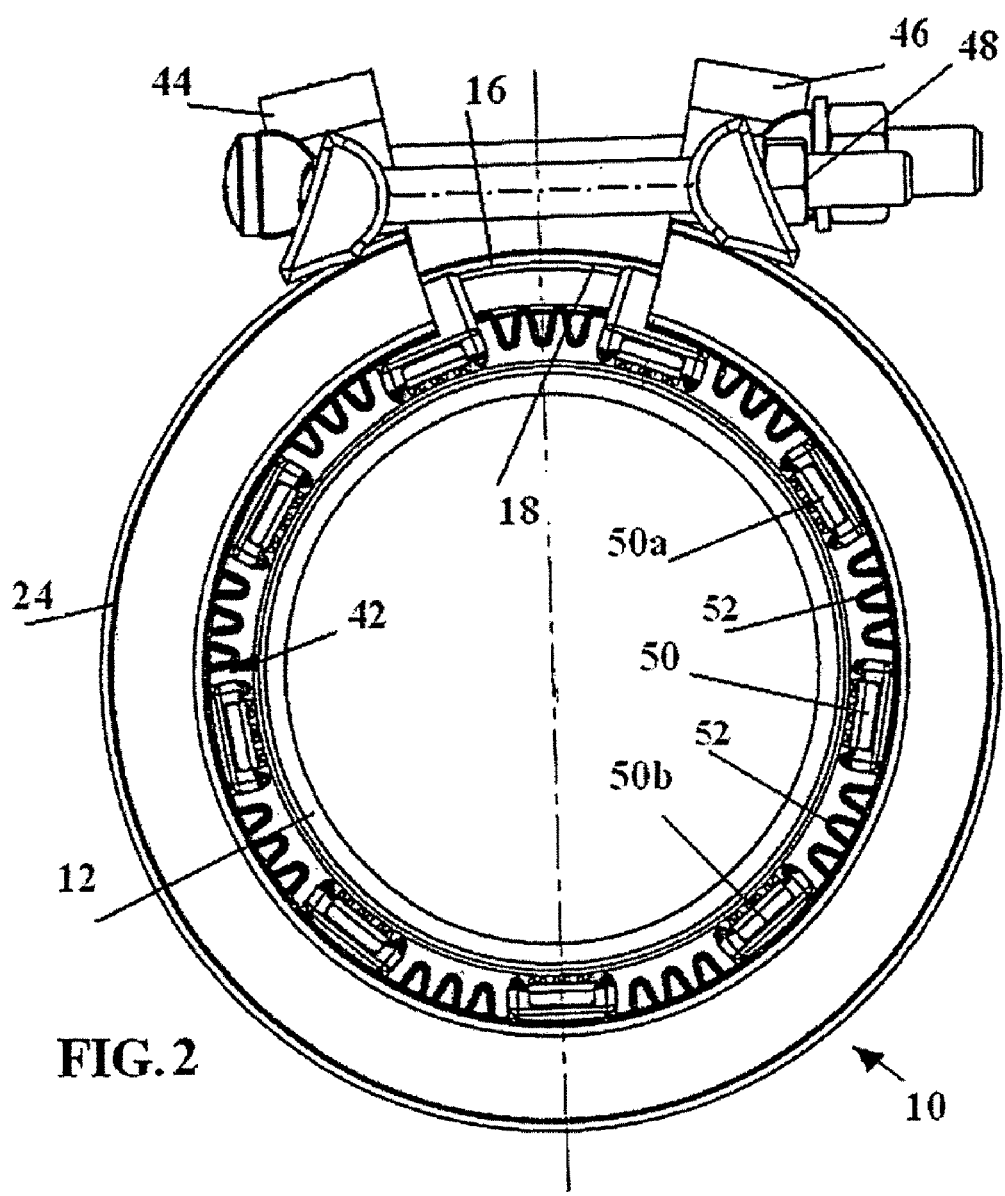
FIG. 2 is a cross-sectional view of the same embodiment, the section being taken perpendicular to the axis.

There is seen in FIG. 1 and FIG. 2 an improved releasable band-clamp coupling 10 for mechanical and hydraulic interconnection of the ends of a first pipe 12 and a co-axial second pipe 14.

A central housing 16 has a cross-section resembling a wide, low-wall channel, wherein the channel walls 18, 20 face away from the center of the pipes 12, 14. The inner diameter 22 of the central housing 16 is slightly larger than the diameter of the largest pipe 12, 14 to be coupled thereby.

Two curved outer clamp members 24, 26 are each configured to make side contact with the inner face 28 of the central housing wall 30. The central portion 32 of the outer clamp members 24, 26 houses a hydraulic seal element 38. The outer portion 40 of the clamp members 24, 26 is sloped inwards about 25-45 degrees and houses an elastomeric internally-toothed pipe grip ring 42.

The grip ring 42 comprises a plurality of spaced-apart wedge-shaped gripper units 50. Each gripper unit 50 is connected to both adjacent gripper units 50a, 50b by a flexible element 52 to complete the grip ring 42 and thus suit pipe diameters within its range. For tightening the clamp members 24, 26 against the pipes 12, 14 being coupled, there is provided integral to the ends of the curved outer clamp members 24, 26 a pair of clamping extensions 44, 46.

Screw clamping elements 48 are in contact with the clamping extensions 44, 46. Tightening of the screw clamping elements 48 reduces the distance between the substantially parallel clamping extensions 44, 46, thereby closing the outer clamp member and forcing both the grip ring 42 and the elastomeric seal members 38 into circumferential contact with the pipes 12, 14.

With reference to the rest of the figures, similar reference numerals have been used to identify similar parts.

Figure 3:
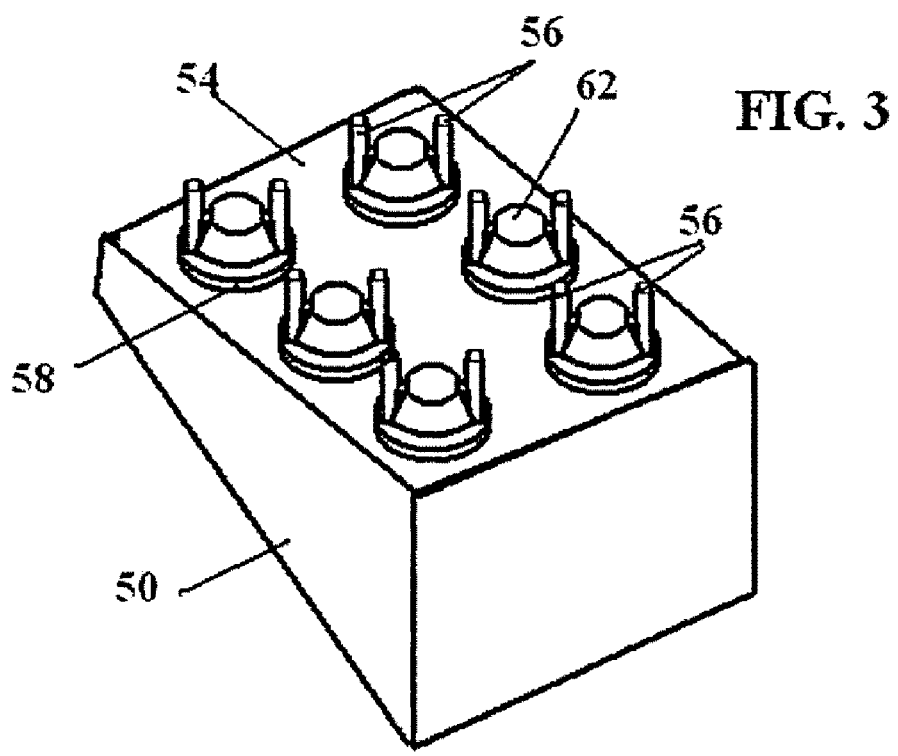
FIG. 3 is a perspective detail view of a wedge-like unit forming part of the grip ring.

FIG. 3 illustrates a detail of the grip ring 42. The wedge-shaped gripper units 50 have a face 54 to contact the pipes being gripped, a multitude of elements 56 being supported directly by the face 54 or as seen an inner cone 62 provides some support for the elements 56 and projecting from the face 54. When the outer clamp member 24, seen in FIG. 1, is tightened the elements 56 are forced into contact with the pipes 12. 14 being coupled. As pressure is applied to unit 50 the elements 56 held thereby enter the outer skin of the pipes 12, 14 and form a multitude of small indentations which provide improved resistance to unintended axial separation of said pipes.

Figure 4:
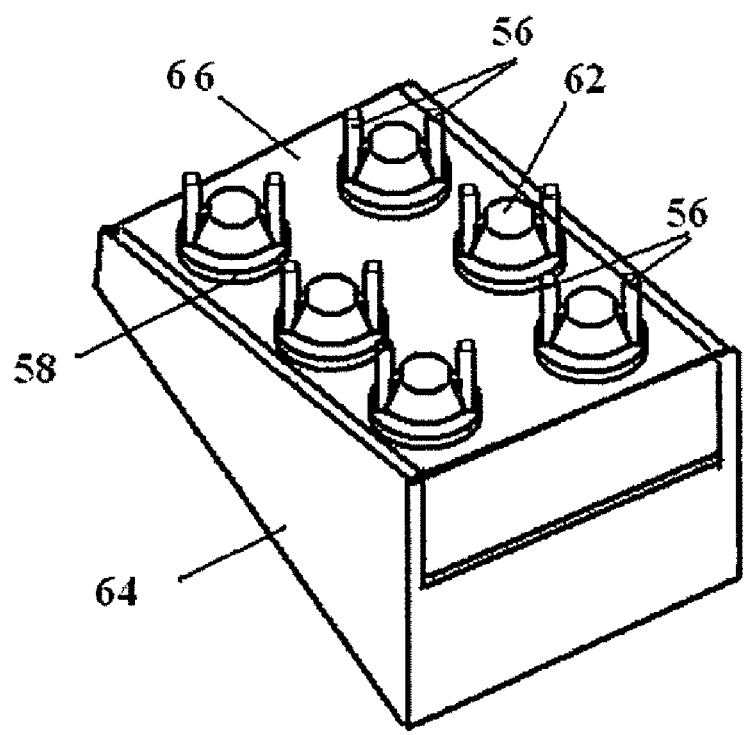
FIG. 4 is a perspective detail view of a second embodiment of the wedge-like unit forming part of the grip ring.

Seen in FIG. 4 is detail of a further preferred construction of the wedge-shaped gripper units 64. Each unit 64 comprises two separate parts: an inner face 66 arranged to contact the pipe surface, and an outer wedge-like portion 58 configured to support, retain and apply pressure to the inner face 66.

An advantage of the gripper unit 64 is that the inner face 66 can be configured to retain the flexible element 68 seen in the following figures, the element 68 being released when the gripper unit 64 is separated from the inner face 66.

Figure 5:
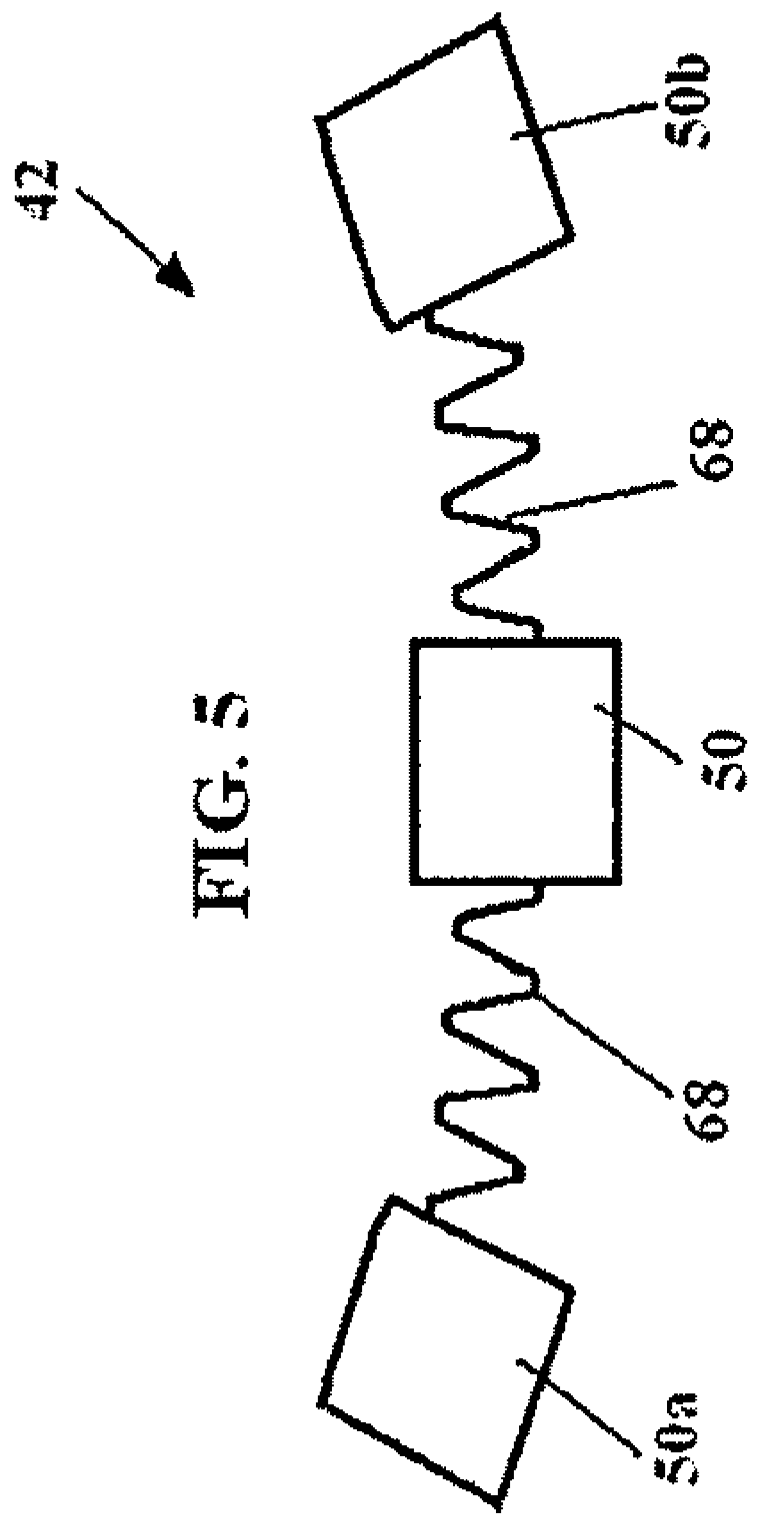
FIG. 5 is a side view of a small portion of the grip ring.

Referring now to FIG. 5, there is depicted a further detail of the elastomeric internally-toothed grip ring 42. The spaced-apart wedge-shaped gripper units 50 are connected to both adjacent gripper units 50a, 50b by a flexible element 68 in wave form to complete the grip ring.

Figure 6:
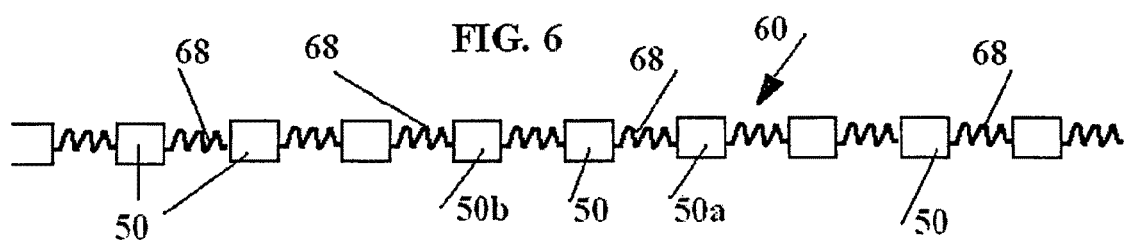
FIG. 6 is a side view of a strip to be cut to length to form a grip ring.

FIG. 6 shows a detail of a band-clamp coupling wherein the wedge-shaped sloped internally-toothed grip ring 42 is open and comprises a plurality of spaced-apart wedge-shaped gripper units 50, 50a, 50b is in the form of a strip 60. The strip 60 can easily be cut on site to any required length. The length usually required is 3.5× the diameter of the pipe to be coupled.

If instead of the wedge-shaped gripper units 50 seen in FIG. 3 the two-part embodiment 64 is used seen in FIG. 4, no cutting is required because flexible element 68 can be detached by lifting or removing the inner face 66.

Figure 7:
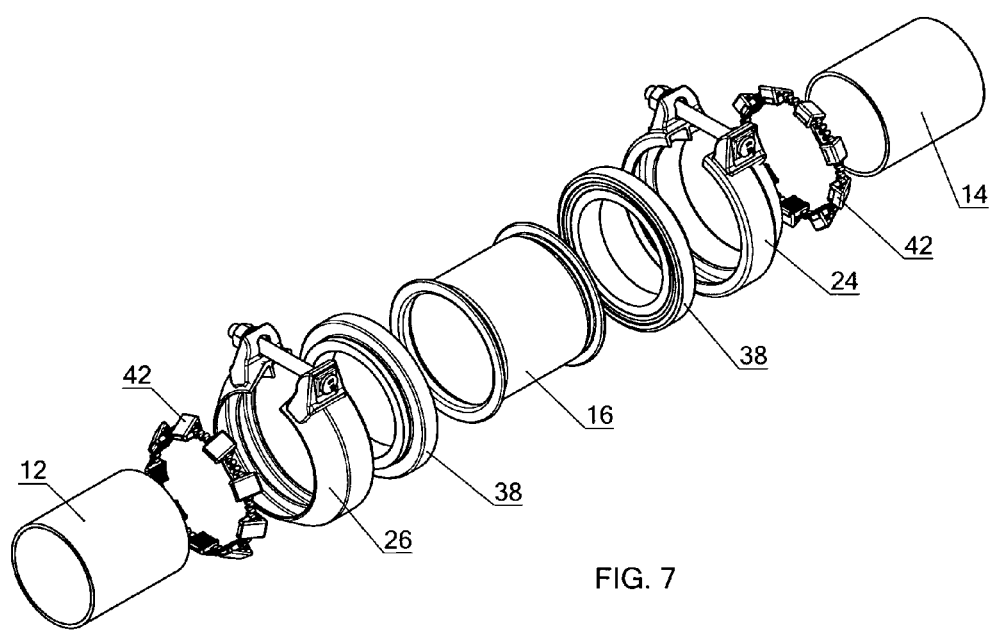
FIG. 7 is an exploded view of the coupling.
Figure 8:
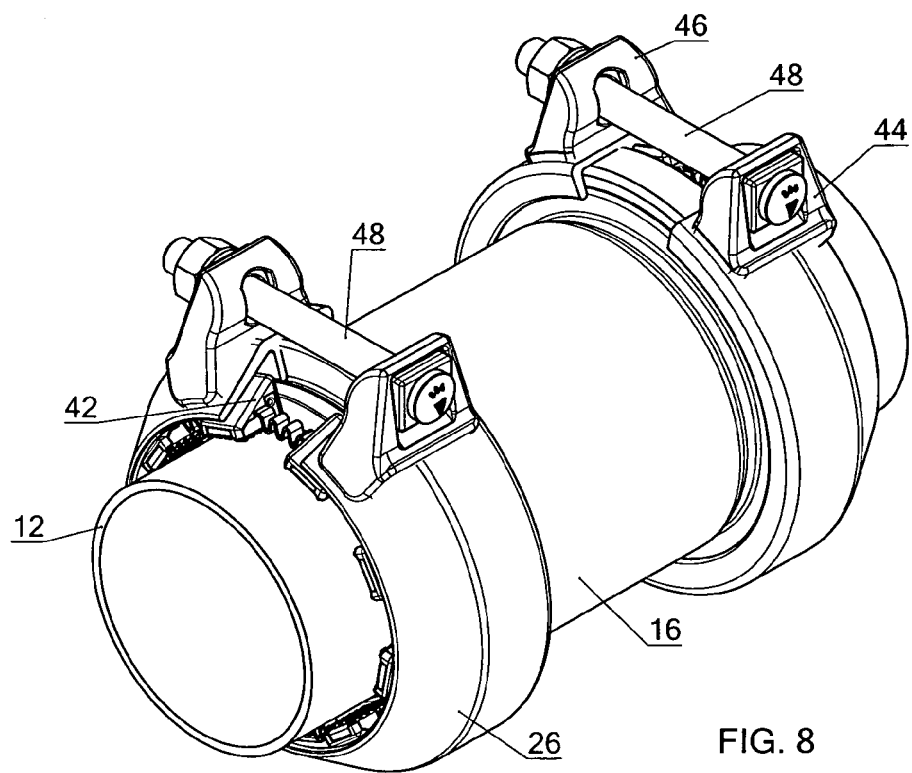
FIG. 8 is a computer-drawn perspective view of the coupling as assembled.

FIGS. 7 and 8 are provided for reference only, to illustrate the major components of the coupling 10 before assembly and after assembly.

The scope of the described invention is intended to include all embodiments coming within the meaning of the following claims. The foregoing examples illustrate useful forms of the invention, but are not to be considered as limiting its scope, as those skilled in the art will be aware that additional variants and modifications of the invention can readily be formulated without departing from the meaning of the following claims.

We claim:

1. An improved releasable band-clamp coupling for mechanical and hydraulic interconnection of the end of at least one first cylinder and a second cylinder or connecting means, said coupling comprising:
   a) a central housing of cross-section resembling a wide, low-wall channel, the walls thereof facing away from the center of said cylinders and the housing being curved to be larger than the said cylinder outer diameter;
   b) at least one curved outer clamp member configured to contact a wall of said central housing and to support a ring seal member and to support a sloped mechanical grip ring, said central housing wall inner face fitting into said outer clamp member to prevent separation therebetween, there being further provided proximate to the end of said curved outer clamp member at least one clamping extension;
   c) a sloped internally-toothed grip ring comprising a plurality of spaced-apart wedge-shaped gripper units, substantially each unit being connected to both adjacent gripper units by a flexible element to complete said grip ring;
   d) at least one circumferential elastomeric seal member; and
   e) screw clamping element in contact with said clamping extension to reduce the distance between said extension, forcing both said sloped internally-toothed grip ring and said elastomeric seal members into circumferential contact with at least one cylinder.

2. The band-clamp coupling as claimed in claim 1, wherein said wedge-shaped gripper units have a face to contact the cylinder being gripped, a multitude of elements being supported by said face and projecting therefrom in a manner that in operation said elements are forced into contact with the cylinders being coupled.

3. The band-clamp coupling as claimed in claim 1, wherein said wedge-shaped gripper units comprise two separate parts, an inner face arranged to contact said cylinder surface, and an outer wedge-like portion configured to support and retain said inner face.

4. The band-clamp coupling as claimed in claim 3, wherein an extremity of two said grip ring flexible elements are retained, one on each side of said gripper units, between said two separate parts.

5. The band-clamp coupling as claimed in claim 1, wherein said wedge-shaped sloped internally-toothed grip ring is open and comprises a plurality of spaced-apart wedge-shaped gripper units is in the form of a strip which can be cut on site to any required length.

6. The band-clamp coupling as claimed in claim 1, wherein said spaced-apart wedge-shaped gripper units are connected to both adjacent gripper units by said flexible element to complete said grip ring.

7. The band-clamp coupling as claimed in claim 1, wherein said cylinders are pipes.

\* \* \* \* \*